Nov. 21, 1967  L. J. DOWD  3,353,751
SELF-PROPELLED IRRIGATION APPARATUS
Filed Aug. 6, 1965  6 Sheets-Sheet 1

INVENTOR.
LEO J. DOWD,
BY
Berman, Davidson & Berman
ATTORNEYS.

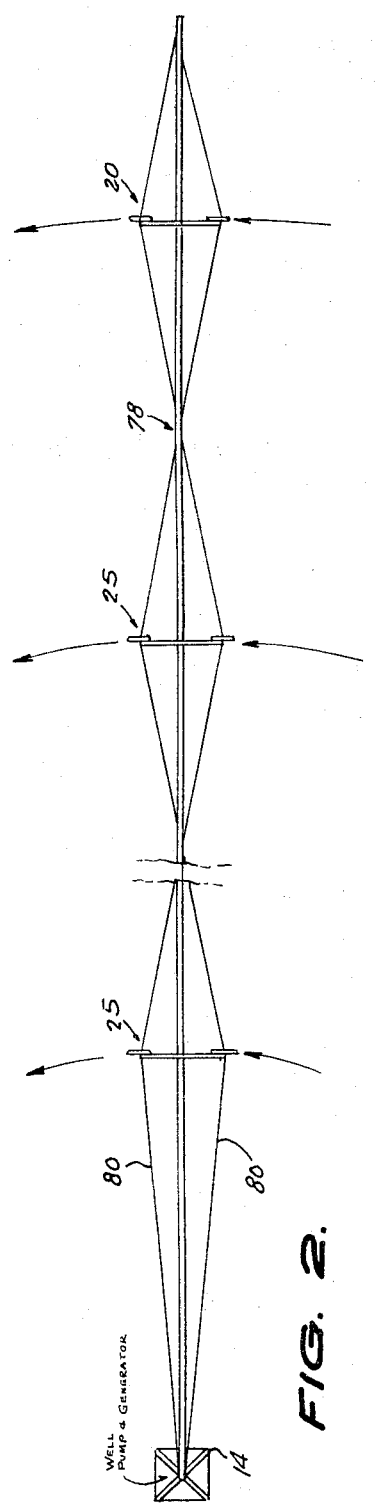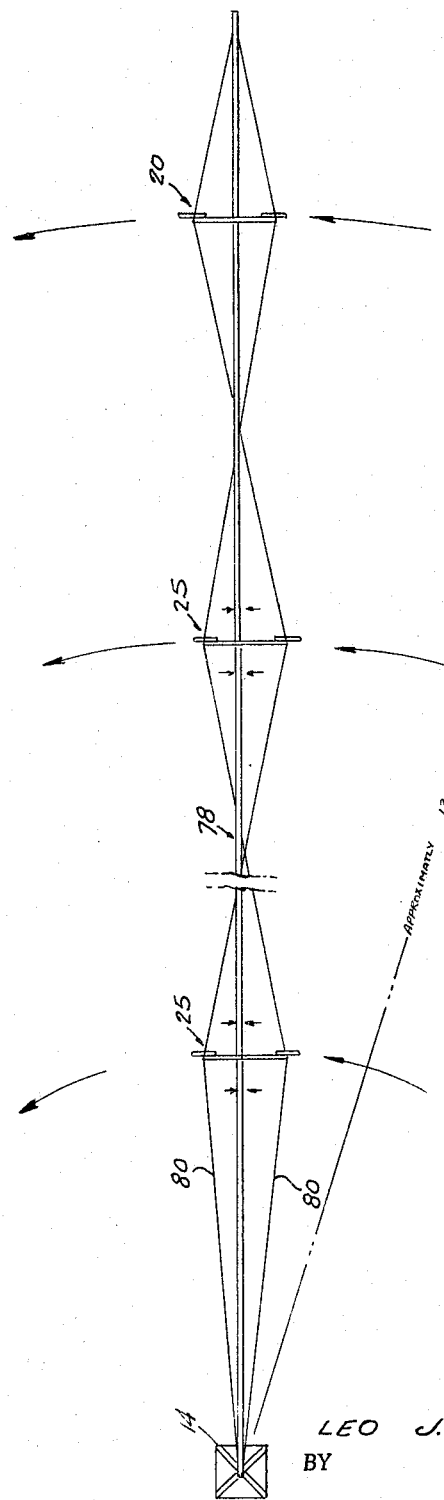

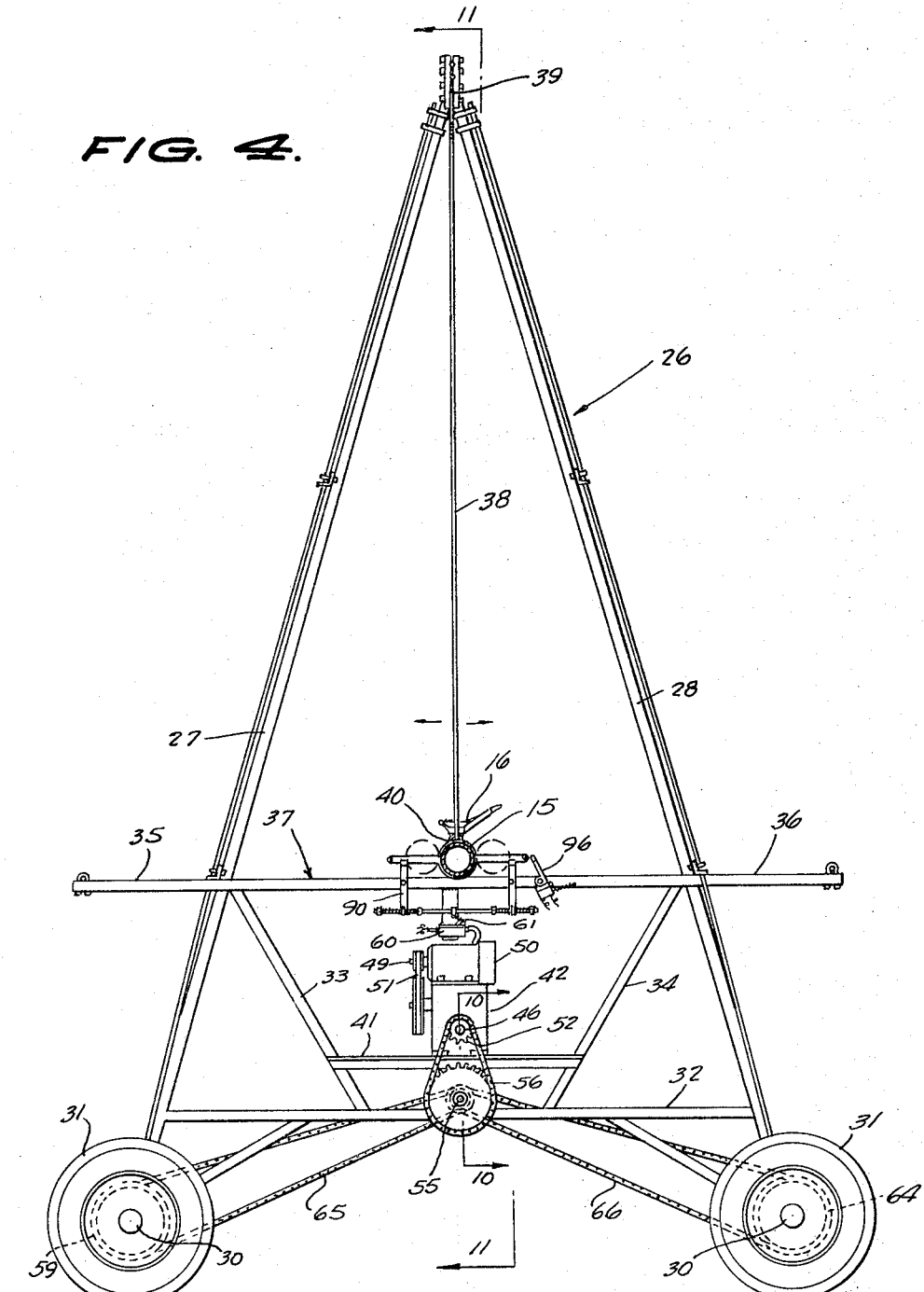

Nov. 21, 1967  L. J. DOWD  3,353,751
SELF-PROPELLED IRRIGATION APPARATUS
Filed Aug. 6, 1965  6 Sheets-Sheet 4

INVENTOR.
LEO J. DOWD,
BY
Berman, Davidson + Berman
ATTORNEYS.

Nov. 21, 1967  L. J. DOWD  3,353,751
SELF-PROPELLED IRRIGATION APPARATUS
Filed Aug. 6, 1965  6 Sheets-Sheet 5

INVENTOR.
LEO J. DOWD,
BY
Berman, Davidson & Berman
ATTORNEYS.

Nov. 21, 1967     L. J. DOWD     3,353,751
SELF-PROPELLED IRRIGATION APPARATUS
Filed Aug. 6, 1965     6 Sheets-Sheet 6
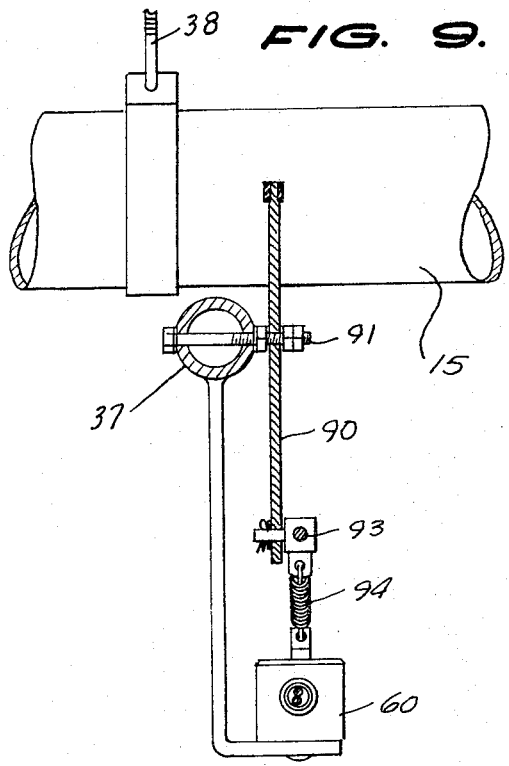
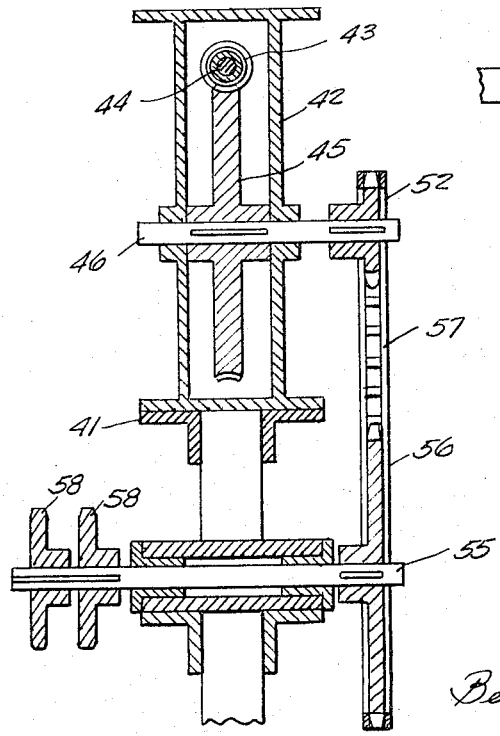
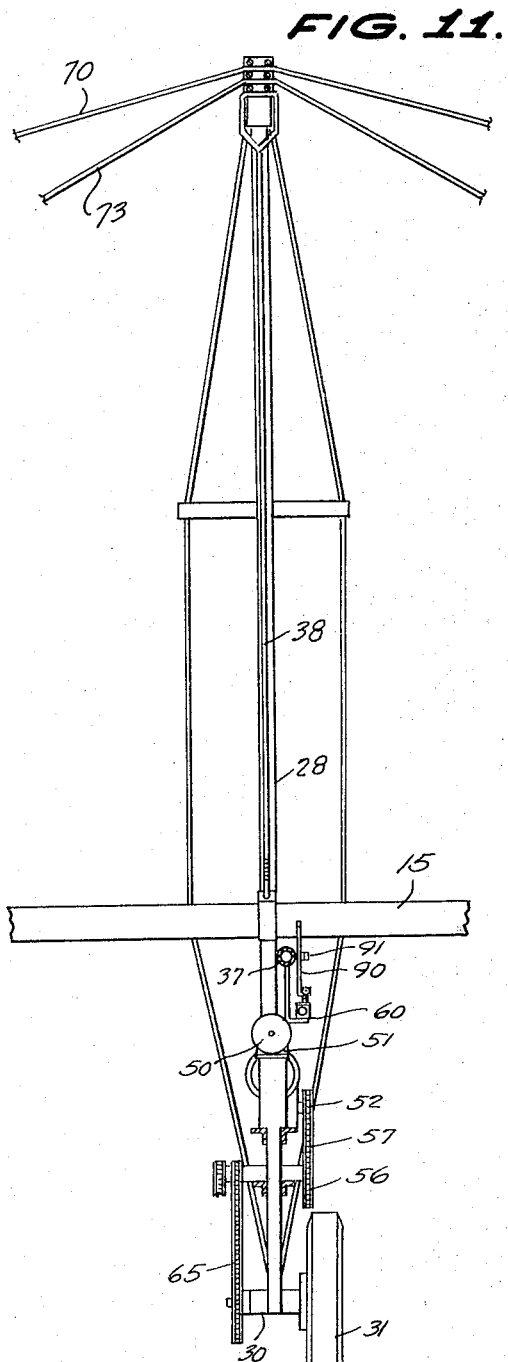
INVENTOR.
LEO J. DOWD,
BY
Berman, Davidson + Berman
ATTORNEYS.

United States Patent Office 3,353,751
Patented Nov. 21, 1967

3,353,751
SELF-PROPELLED IRRIGATION APPARATUS
Leo J. Dowd, 117 South Parkway,
Columbus, Nebr. 68601
Filed Aug. 6, 1965, Ser. No. 477,752
3 Claims. (Cl. 239—177)

ABSTRACT OF THE DISCLOSURE

A self-propelled irrigation apparatus of the type in which a water distributing pipe is revolved about one end as a pivot being carried by an outer mobile support and a plurality of intermediate mobile supports each driven over the ground to be sprayed by an individual electric motor, means suspending the distributing pipe on each intermediate support in pendulum fashion and control means on each intermediate support engaged by the distributing pipe to energize and de-energize the motor in accordance with to-and-fro movements of the distributing pipe.

---

This invention relates to a self-propelled irrigation apparatus for watering a large tract of land.

An object of the invention is to provide a self-propelled irrigation apparatus wherein the intermediate mobile supports for the water-distributing pipe are each driven in response to its lagging behind of the constantly driven main mobile support, and are each rendered inactive in response to its restoration to a position of alignment with the main support.

Another object of the present invention is to provide a self-propelled irrigation apparatus wherein a control element on each of the intermediate mobile supports for the water-distributing pipe is operable to energize the electric motor and activate its attendant drive means in accordance with lagging behind of the constantly driven main mobile support, and to de-energize the electric motor and stop its attendant drive means in accordance with restoration of the intermediate support to a position of alignment with the main support.

A further object of the invention is to provide a self-propelled irrigation apparatus wherein the water-distributing pipe is fixedly-supported on the main mobile support, and is suspendingly-supported on each of the intermediate mobile supports.

A still further object of the invention is to provide a self-propelled irrigation apparatus which is simple in construction, positive in action, and commercially practical.

Other objects and advantages of the invention will become apparent from the following description taken in conjunction with the accompanying drawings, in which:

FIGURE 2 is a diagrammatic showing of the self-propelled irrigation apparatus of the present invention, illustrating the main and intermediate mobile supports in position of alignment and rotational movements when in such position.

FIGURE 3 is a diagrammatic showing of the assembly of FIGURE 2, but illustrating the rotational movements of the main and intermediate mobile supports, and the shifting of the position of the water-distributing pipe during lagging rotational movements of the mobile intermediate supports.

FIGURE 4 is a transverse elevational view taken on the line 4—4 of FIGURE 1.

FIGURE 9 is a sectional view taken on the line 9—9 of FIGURE 7.

FIGURE 10 is a sectional view taken on the line 10—10 of FIGURE 4.

FIGURE 11 is a sectional view taken on the line 11—11 of FIGURE 4.

Figure 1:
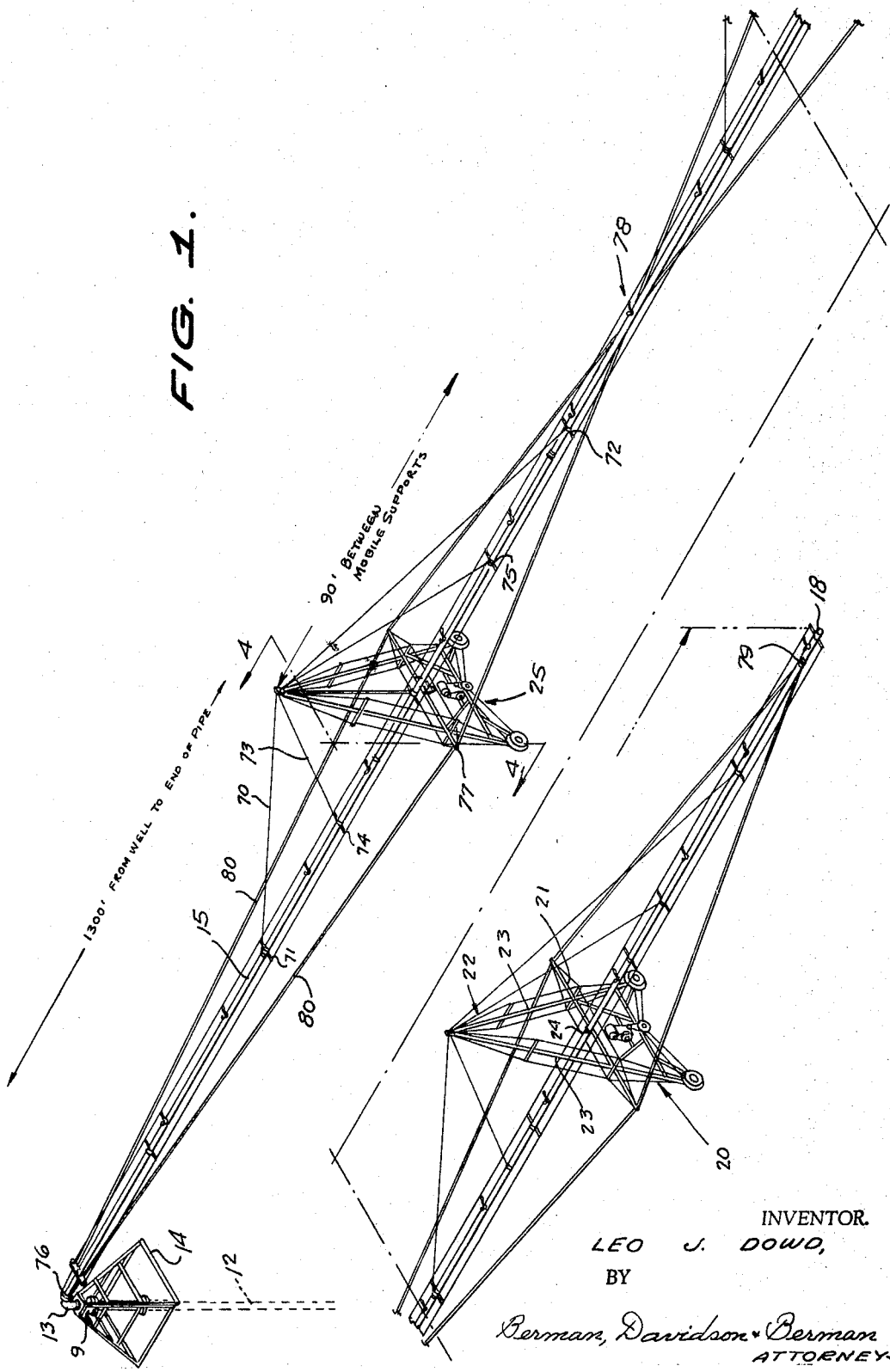
FIGURE 1 is a perspective view, with parts broken away, of the self-propelled irrigation apparatus according to the present invention.

Referring to the drawings, the numeral 10 designates generally the self-propelled irrigation apparatus according to the present invention. Such apparatus, FIGURE 1, comprises an upstanding water-supply pipe 12 which has its lower end submerged in a well containing water, not shown, the upper end of the pipe 12 being received in one arm of an elbow 13 which is supported in the top or apex of pyramidal-shaped skeleton frame 14 resting upon the surface of the land above the well, the free end of the arm of the elbow 13 and the upper end of the pipe 12 being connected together by a rotary joint 9. An elongated horizontally-disposed water-distributing pipe 15 has one end fixedly-received in the other arm of the elbow 13. By virtue of the rotary joint 9 the distributing pipe 15 is pivotally-connected to the water-supply pipe 12 for movement of the distributing pipe about the water-supply pipe 12 as an axis. The distributing pipe 15 is made up of a plurality of sections of pipe, the sections being fixedly-connected together in the conventional manner. It is to be noted that the connections of the respective pipe sections are such as to permit limited flexing of the pipe 15. As this forms no part of the invention, no further description appears necessary.

A plurality of discharge nozzles 16 are spaced along the distributing pipe 15 between its ends thereof and serves to spray water onto the land as the distributing pipe 15 moves about the supply pipe 12 as an axis. Inasmuch as the nozzles 16 employed are of the well-known type and form no part of the invention, further description is deemed unnecessary.

It is to be noted that operatively-associated with the pipe 12 is a pump (not shown), for forcing the water from the well up through the supply pipe 12 and into and through the pipe 15.

A main mobile support 20, FIGURE 1, is disposed transversely of the distributing pipe 15 adjacent the other end 18 thereof, and fixedly-carries the distributing pipe 15, the pipe 15 being fixedly-secured to a horizontally-disposed strut 21 extending transversely across and secured to the legs 23 of an upstanding A-frame 22. Specifically, the pipe 15 is fixedly-secured to the strut 21 by means of an inverted U-shaped clamp 24. It is to be noted that the main support 20 is constantly driven, and by virtue of it being so driven, effects the rotation of the distributing pipe 15 about the upstanding supply pipe 12 as an axis.

A plurality of intermediate mobile supports 25 are arranged transversely of and at spaced positions along the distributing pipe 15 between the ends thereof. In FIGURE 1, only one of the supports 25 is shown, and in FIGURES 2 and 3, two of the supports 25 are shown between the main support 20 and the water-supply pipe 12. However, the number of intermediate supports 25 is variable, and depends upon the total length of the distributing pipe 15. If the total length of the distributing pipe 15 is 1300-feet, then the intermediate supports 25 should be located along the pipe 15 at about 20 or 30-feet spacing therebetween. However, the spacing of the intermediate supports 25 is optional.

Figure 5:
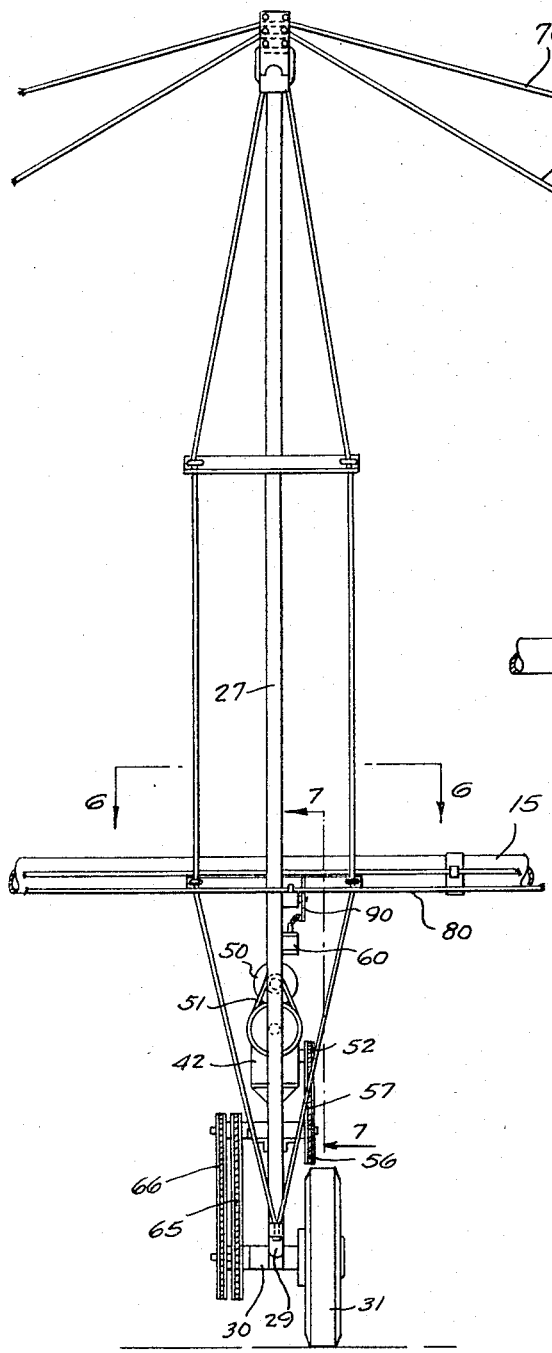
FIGURE 5 is a left-hand side elevational view of the assembly of FIGURE 4.
Figure 6:
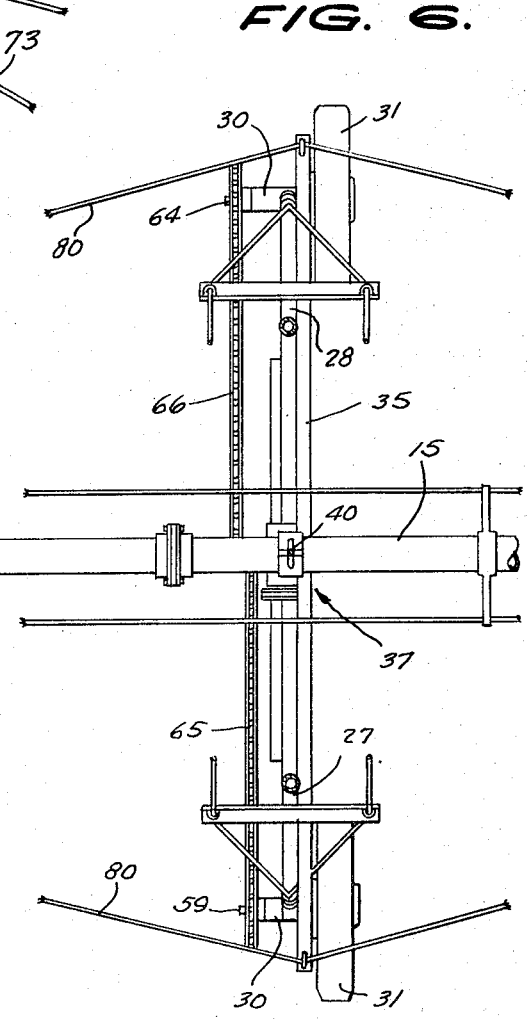
FIGURE 6 is a top sectional view taken on the line 6—6 of FIGURE 5.

On each of the intermediate supports 25 there is a means which suspendingly-supports the adjacent portion of the distributing pipe 15. Since the construction of each intermediate support is the same, only one of such supports will be specifically described. Referring to FIGURES 1 and 4, the support 25 includes an upstanding A-frame 26 which has the lower ends of its legs 27 and 28 secured to bosses 29, FIGURE 5, the bosses 29 having journaled therein stub shafts 30 carrying land-engaging wheels 31. The A-frame 26 has a base leg 32 which extends between the legs 27 and 28 adjacent the lower ends thereof, and is secured to the legs 27 and 28, and braces 33 and 34 extend from the legs 27 and 28 to the base leg 32 and are secured to the legs 27 and 28 and base leg 32, respectively. An elongated strut 37 extends transversely across and is secured to the legs 27 and 28 of the A-frame 26, and is located above and parallel to the base leg 32, the strut having one end portion 35 projecting outwardly of the leg 27 and having the other end portion 36 projecting outwardly of the leg 28. A pendulum 38 is disposed within the A-frame 26 and has the upper end pivotally-supported from the apex of the A-frame 26 as at 39, the lower end of the pendulum being pivotally-connected to the adjacent portion of the distributing pipe as by being secured to an eye 40, as shown in FIGURE 4.

Figure 7:
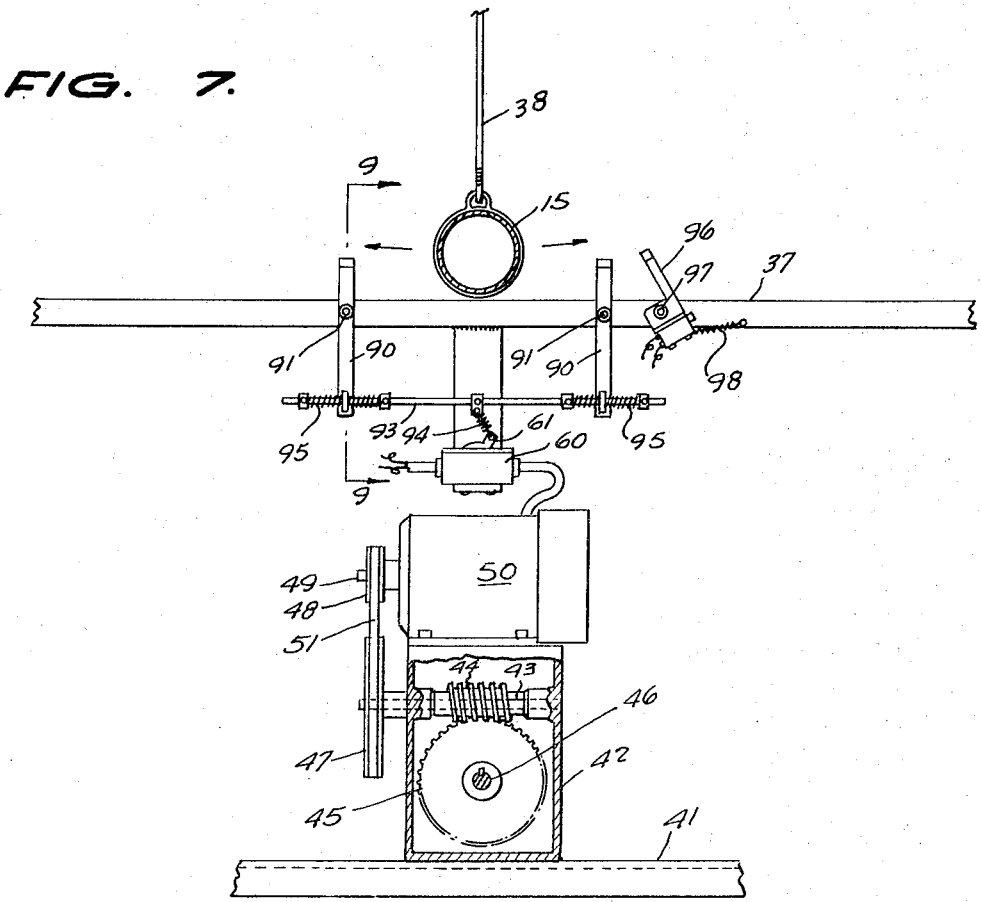
FIGURE 7 is an enlarged fragmentary sectional view taken on the line 7—7 of FIGURE 5.

The A-frame 26 of the intermediate support 25 carries an electric motor drive means for causing travel of the support over the land surface to be irrigated. On this A-frame 26 is a bracket 41 which extends from brace 33 to brace 34 and is fixedly-attached to the braces 33 and 34. On this bracket 41 is mounted a speed-reduction unit 42 and surmounting and operatively-connected to this unit 42 is an electric motor 50, the unit 42 being drivingly-connected to the land-engaging wheels 31. The unit 42, FIGURE 7, includes a driven shaft 43 which carries a worm 44 in mesh with the gear 45 on a driven shaft 46. The shaft 46, FIGURE 7, has an end portion projecting out of the side of the unit 42 and on such projection end portion is a pulley 47 which is drivingly-connected to a pulley 48 on the drive shaft 49 of an electric motor 50, surmounting the unit 42, by means of a drive belt 51. Operatively-connected to the motor 50 is a conventional switch 60, the switch being provided with a control element or operating lever 61 for shifting the switch between closed and open positions. The control element of the operating lever 61, as shown in FIGURES 4 and 7, is in the closed position. The driven shaft 46, FIGURE 10, also has another end portion which projects out of the other or opposite side of the unit 42, and on this projecting end portion is a spur gear 52. The A-frame 26 of the intermediate support 25 has a main drive shaft 55 for driving the land-engaging wheels 31. The shaft 55 carries a gear 56 which is drivingly-connected to the spur gear 52 by means of a drive chain 57. The shaft 55 also carries a pair of like spur gears 58 which are arranged in side-by-side spaced relation as shown in FIGURE 10, one of the spur gears 58 being drivingly-connected to a gear 59 on one of the stub shafts 30 by means of a drive chain 65, and the other of the gears 58 being drivingly-connected to a gear 64 on the other of the stub shafts 30 by means of a drive chain 66.

The A-frame 22 of the main mobile support 20, FIGURE 1, has an identical bracket carrying a speed-reduction unit and an electric motor operatively-connected thereto with drive means operatively-connecting the speed-reduction unit to the land-engaging wheels on the frame 22, as above-described, in connection with the intermediate mobile support 25, except that the control element or switch-operating lever is manually-operated to put the apparatus either in or out of operation, and is not automatically-operated as in the case of the switch lever on each of the intermediate supports 25.

A guy cable construction is provided for connecting the A-frame 22 of the main mobile support 20 and the A-frames 26 of the intermediate supports 25 together and holding the respective supports in alignment. Such construction comprises a cable 70 having its mid-point stretched over and attached to the apex of the A-frame 22 of the main mobile support 20 and over that of each of the A-frames 26 of the intermediate mobile supports 25 with its ends fixedly-attached to the water-distributing pipe 15 as at 71 and 72, FIGURE 1, and a shorter cable 73 having its mid-point stretched over and attached to the apex of the A-frame 22 of the main mobile support 20 and over that of each of the A-frames 26 of the intermediate mobile supports 25 with its ends fixedly-attached to the water-distributing pipe 15 as at 74 and 75. A main cable 80 is disposed on one side of the distributing pipe 15 and has one end affixed to the pipe 15 inwardly of and adjacent the skeleton frame 14, as at 76, the cable being stretched along the one side of the distributing pipe 15 through a U-shaped bolt 77 provided on the adjacent free end of the strut 37 of the A-frame 26 of the first intermediate support 25, thence along and across the distributing pipe 15, the cable being fastened at the cross-over point to the pipe 15 as at 78. The cable 80 is then stretched to the opposite side of the pipe 15 and along this side and through a U-shaped bolt provided on the adjacent free end of the strut 37 of the A-frame 26 of the second intermediate support 25, thence along and across the distributing pipe 15, the cable being fastened to the pipe 15 at the second cross-over point, not shown. This stretching of the cable 80 is continued until it is trained through a U-shaped bolt provided on the strut 21 of the A-frame 22 of the main support 20, FIGURE 1, and then stretched along the pipe 15 with its free end fastened to the pipe adjacent its end 18, as at 79. A like main cable 80 is stretched along the distributing pipe 15 and fastened to the struts of the A-frames of the intermediate and main supports 25 and 20, respectively, in the same manner as described in connection with the cable 80. It is to be noted that this like main cable 80 is stretched in an opposite direction along the distributing pipe 15 from that of the first-mentioned cable 80.

Figure 8:
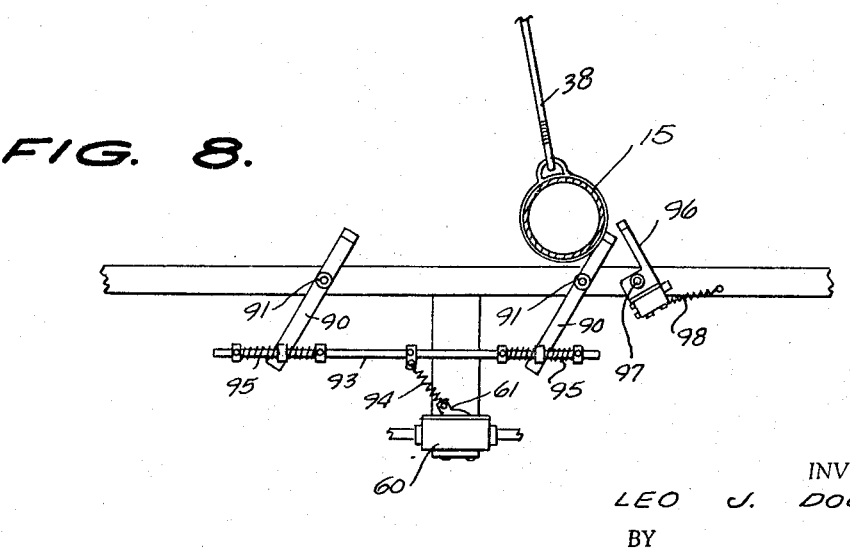
FIGURE 8 is a view of the top portion of the assembly of FIGURE 7 illustrating the water-distributing pipe in bearing engagement with one of the levers for actuating the control element.

The control element or operating lever 61 of the motor 50 of each intermediate support is operable to energize the electric motor 50 and activate its attendant drive means or reduction unit 42 in accordance with lagging behind of the intermediate support, and to de-energize the electric motor 50 and stop its attendant drive means or reduction unit 42 in accordance with restoration of the intermediate support to a position of alignment with the main support 20. Specifically, actuating means is operatively-connected to the control element or operating lever 61 on each intermediate support 25, such means comprising, FIGURE 7, a pair of upstanding levers 90 disposed within the A-frame 26 of the intermediate support 25, and on opposed sides of and spaced from the distributing pipe 15, the levers 90 being connected to the A-frame 26 or strut 37 on the frame 26 for pivotal movement together about spaced horizontal axes 91 between the upstanding position of FIGURE 7 and positions sloping from one or the other side of their axes. FIGURE 8 illustrates the levers 90 moved to a position sloping to one side of their axes 91 or the position in which the control element or switch-operating lever 61 has been shifted to close the switch 60, to energize the electric motor and activate its attendant drive means in accordance with the lagging behind of the intermediate support 25. Movement of the levers 90 to the side opposite to that shown in FIGURE 8 results in shifting of the control element or operating switch 61 to deenergize the electric motor 50 and stop its attendant drive means in accordance with restoration of the intermediate support 25 to a position of alignment with the main support 20.

Means is provided for connecting the control element or operating lever 61 to the pair of levers 90 for movement with the latter levers, such means comprising a link 93, FIGURES 4, 7 and 8, which extends between and is pivotally-connected to the lower ends of the pair of levers 90, and spring means or a coil spring 94 connects the link 93 to the control element or operating lever 61. For biasing the levers 90 toward the upstanding position a spring means or coil spring 95 is operatively-connected to the link 93 adjacent each of the pivotally-connected lower ends of the pair of levers 90, as clearly shown in FIGURES 7 and 8.

Referring to FIGURE 7, it will be seen that the switch-actuating lever 96 is disposed outwardly of and adjacent the lever 90 which, when shifted to the position sloping from one side of its axis 91 or the position of FIGURE 8, moves the control element or operating lever 61 to close the switch 60 to energize the electric motor 50 and actuate its attendant drive means or reduction unit 42 in accordance with the lagging behind of the intermediate support 25, the actuating lever 96 being connected to the strut 37 for pivotal movement about a horizontal axis 97, and having the lower end connected to the strut 37 by means of a spring means or coil spring 98. This switch-actuating lever 96 is electrically-connected to the power source, not shown, supplying current for operating the apparatus. In the event that the pipe 15 should swing over the top of the lever 90 and engage the lever 96, the lever 96 is swung about its axis 97 against the action of the spring 98 to open the switch to the power source and shut down the apparatus.

*Operation*

In operation, with the pump in the supply pipe 12 in operation, the control element or switch-operating lever on the main support 20 is shifted to close its switch, to thereby energize its electric motor and activate its attendant drive means and constantly drive the main support 20, the constant driving of the main support 20 causing the distributing pipe 15 to rotate about the supply pipe 12 as an axis. As the distributing pipe rotates, water is discharged from the nozzles 16 and is distributed over and deposited upon the land underneath and thereby irrigates such land. Should an intermediate support 25 lag behind the main support 20, the distributing pipe 15 bears against one of the levers 90 and swings it about its axis 91 to a position sloping to one side of its axis 91 or the position of FIGURE 8, resulting in the shifting of the control element or switch-operating lever 61 to close the switch 60, to energize the electric motor 50, and activate its attendant drive means or reduction unit 42, and positively drive the intermediate support 25. The positive driving of the intermediate support 25 causes the latter support to move forwardly, resulting in the distributing pipe 15 bearing against the other of the levers 90 and swing about its axis 91 to a position sloping to the other side of its axis or a position opposite to that depicted in FIGURE 8, resulting in the shifting of the control element or switch-operating lever 61 to open the switch 60 to de-energize the electric motor 50, and stop its attendant drive means or reduction unit 42, followed by restoration of the intermediate support 25 to a position of alignment with the main support 20 and return of the levers 90 to the upstanding position, or the position of FIGURE 7.

What is claimed is:

1. A self-propelled irrigation apparatus comprising an upstanding water supply pipe, an elongated horizontally disposed water distributing pipe having one end pivotally connected to said supply pipe for movement of said distributing pipe about said supply pipe as an axis, a main mobile support disposed transversely of said distributing pipe adjacent the other end thereof and fixedly carrying said distributing pipe, a plurality of discharge nozzles spaced along said distributing pipe between its ends for spraying water onto the land as the distributing pipe moves about said supply pipe as an axis, a plurality of intermediate mobile supports arranged transversely of and at spaced positions along said distributing pipe, means on each intermediate support suspendingly supporting the adjacent portion of said distributing pipe, an upstanding frame rising from said support, a pendulum within and having the upper end pivotally supported from said frame and having the lower end pivotally connected to the adjacent portion of said distributing pipe, electric motor drive means on each intermediate support, a control element operatively connected to the electric motor of each intermediate support and operable to energize the electric motor and activate its intended drive means in accordance with lagging behind of the intermediate support and to de-energize the electric motor and stop its intended drive means in accordance with restoration of said intermediate support to a position of alignment with said main support, and actuating means operatively-connected to the control element on each intermediate support, said actuating means comprising a pair of upstanding levers disposed within the frame of each intermediate support and on opposed sides of and spaced from said distributing pipe and connected to the frame for pivotal movement together about spaced horizontal axes between the upstanding position and positions sloping from one or the other side of their axes, and means connecting the adjacent control element to said pair of levers for movement with the latter levers, one of the levers of each pair being in bearing contact with said distributing pipe upon execution of the movement of the pair of levers to one side of their axes to shift the control elements to energize the electric motor and activate its attendant drive means in accordance with lagging behind of the intermediate support and the other of the levers of each pair being in bearing contact with said distributing pipe upon execution of the movement of the pair of levers to the other side of their axes to shift the control element to de-energize the electric motor and stop its attendant drive means in accordance with restoration of the intermediate support to a position of alignment with said main support.

2. The apparatus according to claim 1, wherein the means connecting the adjacent control element to said pair of levers comprises a link extending between and pivotally-connected to the lower ends of said pair of levers, and spring means connecting said link to the adjacent control element.

3. The apparatus according to claim 2, which includes spring means operatively-connected to said link adjacent each of the pivotally-connected lower ends of said pair of levers for biasing the levers toward the upstanding position.

References Cited

UNITED STATES PATENTS

| | | | |
|---|---|---|---|
| 1,966,783 | 7/1934 | Balaam | 239—212 |
| 2,889,948 | 6/1959 | Leuenberger | 239—212 |
| 2,893,643 | 7/1959 | Gordon | 239—177 |
| 2,931,579 | 4/1960 | Buddell | 239—212 |
| 3,001,721 | 9/1961 | Zybach | 239—177 |
| 3,281,080 | 10/1966 | Hogg | 239—212 |
| 3,314,608 | 4/1967 | Curtis et al. | 239—177 |

M. HENSON WOOD, JR., *Primary Examiner.*

V. C. WILKS, *Assistant Examiner.*